United States Patent
Tarquinio et al.

(10) Patent No.: US 12,321,319 B1
(45) Date of Patent: Jun. 3, 2025

(54) OBJECT LOCK ACROSS VERSIONING MODES IN OBJECT STORAGE

(71) Applicant: Dell Products, L.P., Round Rock, TX (US)

(72) Inventors: Brandon Tarquinio, Seattle, WA (US); Matthew Troutman, Cypress, TX (US); Yuxi Cui, Kenmore, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/424,355

(22) Filed: Jan. 26, 2024

(51) Int. Cl.
| | | |
|---|---|---|
| *G06F 7/00* | (2006.01) | |
| *G06F 16/16* | (2019.01) | |
| *G06F 16/176* | (2019.01) | |
| *G06F 16/18* | (2019.01) | |
| *G06F 21/31* | (2013.01) | |

(52) U.S. Cl.
CPC ........ *G06F 16/1873* (2019.01); *G06F 16/162* (2019.01); *G06F 16/1774* (2019.01); *G06F 21/31* (2013.01)

(58) Field of Classification Search
CPC ............... G06F 16/1873; G06F 16/162; G06F 16/1774; G06F 21/31
USPC ....... 707/638, 661, 695, 705, 737, 781, 822, 707/17.005, 17.054; 711/4, 100, 103, 711/102, 115, 154, 156, 169, 162, 163
See application file for complete search history.

(56) References Cited

U.S. PATENT DOCUMENTS

| | | | | |
|---|---|---|---|---|
| 6,035,297 A | * | 3/2000 | Van Huben | G06F 16/2329 707/999.008 |
| 8,650,156 B1 | * | 2/2014 | McHugh | G06F 12/12 707/638 |
| 2020/0401313 A1 | * | 12/2020 | Cheru | G06F 3/0614 |
| 2022/0091743 A1 | * | 3/2022 | Chang | G06F 3/0604 |
| 2022/0091744 A1 | * | 3/2022 | Kutner | G06F 3/0619 |

* cited by examiner

*Primary Examiner* — Md I Uddin
(74) *Attorney, Agent, or Firm* — Amin, Turocy & Watson, LLP

(57) ABSTRACT

A system can store data in an object storage system as respective objects within respective buckets, wherein a default behavior associated with enabling object lock on a bucket of the buckets comprises enabling versioning on the bucket. The system can store an object of the objects in a first bucket of the buckets, wherein a version of the object is a null version. The system can, in response to receiving a first request to enable object lock on the first bucket that indicates preserving a current off or suspended versioning state, and in response to receiving a second request to lock the null version, locking the null version. The system can process a PUT request to overwrite the object, comprising, refraining from overwriting the object based on the null version of the object being locked, or overwriting the object based on the null version of the object being unlocked.

20 Claims, 13 Drawing Sheets

100

| | | | | REMOVEVERSION 308 | |
|---|---|---|---|---|---|
| SETUP 302 | | OVERWRITE 304 | DELETEOBJECT 306 | NULL 310 | NON-NULL (LOCKED) 312 |
| VERSIONING OFF 314 | LOCKED OBJECT 320 | N | N | N | (N/A) |
| | NO OBJECT / NO LOCK 322 | Y | Y | Y | |
| ENABLED 316 | LOCKED NULL 324 | Y | Y | N | N |
| | NO NULL / NO LOCK 326 | Y | Y | Y | N |
| SUSPENDED 318 | LOCKED NULL 328 | N | N | N | N |
| | NO NULL / NO LOCK 330 | Y | Y | Y | N |

OBJECT LOCK ACROSS VERSIONING MODES IN OBJECT STORAGE COMPONENT 332

ENABLING VERSIONING ON A BUCKET 604

↓

AFTER ENABLING THE VERSIONING ON THE BUCKET, SUSPENDING VERSIONING ON THE BUCKET, WHEREIN WRITING TO AN EXISTING OBJECT IN THE BUCKET COMPRISES OVERWRITING A NULL VERSION OF THE EXISTING OBJECT 606

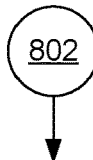

STORING AN OBJECT IN A BUCKET OF AN OBJECT STORAGE SYSTEM, WHEREIN THE OBJECT IS ASSOCIATED WITH A NULL VERSION IDENTIFIER AS A RESULT OF THE OBJECT BEING CREATED WHEN THE FIRST BUCKET IS IN A VERSIONING OFF STATE OR A VERSIONING SUSPENDED STATE, AND WHEREIN A DEFAULT BEHAVIOR ASSOCIATED WITH ENABLING AN OBJECT LOCK IN THE OBJECT STORAGE SYSTEM COMPRISES ENABLING VERSIONING IN THE OBJECT STORAGE SYSTEM 804

IN RESPONSE TO RECEIVING A FIRST REQUEST TO ENABLE OBJECT LOCK ON THE FIRST BUCKET, WHEREIN THE FIRST REQUEST INDICATES PRESERVING A CURRENT VERSIONING STATE THAT IS OFF OR SUSPENDED, AND IN RESPONSE TO RECEIVING A SECOND REQUEST TO LOCK THE NULL VERSION, LOCKING THE NULL VERSION 806

RECEIVING A PUT REQUEST TO OVERWRITE THE OBJECT 808

PROCESSING THE PUT REQUEST, COMPRISING, IN A FIRST CASE WHERE THE NULL VERSION OF THE OBJECT REMAINS LOCKED, REFRAINING FROM OVERWRITING THE OBJECT, OR IN A SECOND CASE WHERE THE NULL VERSION OF THE OBJECT HAS BECOME UNLOCKED, OVERWRITING THE OBJECT 810

FIG. 8

OBJECT LOCK ACROSS VERSIONING MODES IN OBJECT STORAGE

BACKGROUND

An object storage system can store computer data as objects in a flat address space, as part of a logical container referred to as a bucket. This can be viewed in contrast to storing computer data as files in a hierarchical series of directories.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can deploy a microservice to a computer system. The system can store data in an object storage system as respective objects within respective buckets, wherein a default behavior associated with enabling object lock on a bucket of the buckets comprises enabling versioning on the bucket. The system can store an object of the objects in a first bucket of the buckets, wherein a version of the object is a null version as a result of the object being created when the first bucket is in a versioning off state or a versioning suspended state. The system can, in response to receiving a first request to enable object lock on the first bucket, wherein the first request indicates preserving a current versioning state that is off or suspended, and in response to receiving a second request to lock the null version, locking the null version. The system can receive a PUT request to overwrite the object. The system can process the PUT request, comprising, refraining from overwriting the object based on the null version of the object being locked, or overwriting the object based on the null version of the object being unlocked.

An example method can comprise storing, by a system comprising at least one processor, an object in a bucket of an object storage system, wherein the object is associated with a null version identifier as a result of the object being created when the first bucket is in a versioning off state or a versioning suspended state, and wherein a default behavior associated with enabling an object lock in the object storage system comprises enabling versioning in the object storage system. The method can further comprise, in response to receiving a first request to enable object lock on the first bucket, wherein the first request indicates preserving a current versioning state that is off or suspended, and in response to receiving a second request to lock the null version, locking, by the system, the null version. The method can further comprise receiving, by the system, a PUT request to overwrite the object. The method can further comprise processing, by the system, the PUT request, comprising, in a first case where the null version of the object remains locked, refraining, by the system, from overwriting the object, or in a second case where the null version of the object has become unlocked, overwriting, by the system, the object.

An example non-transitory computer-readable medium can comprise instructions that, in response to execution, cause a system comprising a processor to perform operations. These operations can comprise storing an object in a bucket of an object storage system, wherein the object is associated with a null version identifier as a result of the object being created when the first bucket is in a versioning off state or a versioning suspended state, and wherein a default behavior associated with enabling an object lock in the object storage system comprises enabling versioning in the object storage system. These operations can further comprise, in response to receiving a first request to enable object lock on the first bucket, wherein the first request indicates preserving a current versioning state that is off or suspended, and in response to receiving a second request to lock the null version, locking the null version. These operations can further comprise receiving a PUT request to overwrite the object. These operations can further comprise processing the PUT request, comprising overwriting the object based on the null version of the object having become unlocked.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example table of versioning types that can facilitate object lock across versioning modes in object storage, in accordance with an embodiment of this disclosure;

FIG. 6 illustrates an example process flow that can facilitate object lock across versioning modes in object storage, in accordance with an embodiment of this disclosure;

FIG. 8 illustrates an example process flow that can facilitate object lock across versioning modes in object storage, in accordance with an embodiment of this disclosure;

DETAILED DESCRIPTION

Overview

Figure 1:
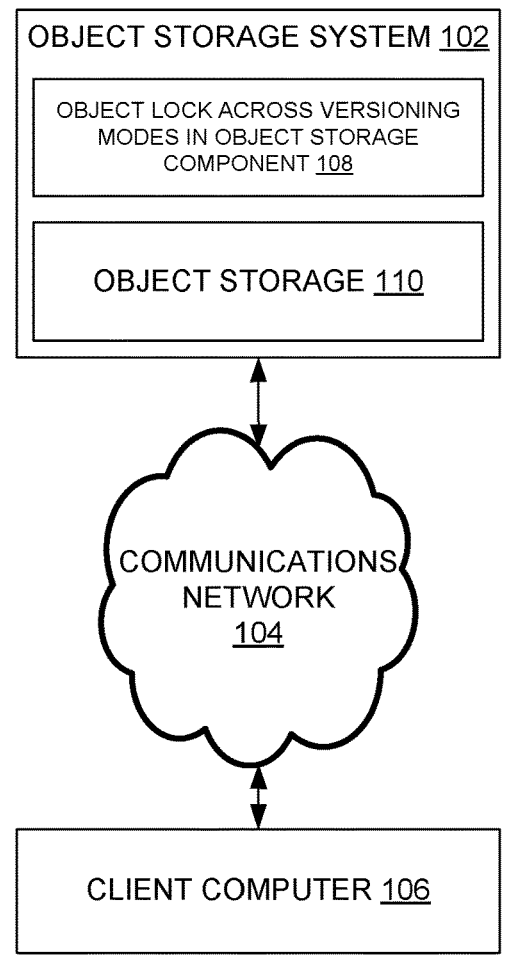
FIG. 1 illustrates an example system architecture that can facilitate object lock across versioning modes in object storage, in accordance with an embodiment of this disclosure.

Requests to the object storage system, such as to PUT or DELETE, can be made via a representational state transfer (REST) application programming interface (API). In a REST API, a user can send a hypertext transfer protocol (HTTP) message to an object storage system that identifies the object storage system (e.g., example.com), the object being affected, an operation on that object (e.g., DELETE), and other information (e.g., a flag to indicate retaining version state).

Object Lock can be a feature of an object storage protocol that protects versions of an object from being removed. The lock can prevent removals until either a retention period has expired, a legal hold is disabled, or a special bypass permission is used. A first step of using Object Lock can be to enable it on a bucket, which will then automatically enable bucket versioning if it is not already enabled. Once enabled, according to some object storage protocols, it can be that both Object Lock and versioning can never be disabled on the bucket. This issue of requiring versioning can be a major drawback of Object Lock since users can have applications that are not built for versioning, though the users do want protection of objects. Versioning can change the way that some operations behave, and can cause large amounts of data overhead if the application does not remove old versions manually, or by using appropriate lifecycle expiration policies. Furthermore, users can expect locks to prevent delete and overwrite operations from being successful while the lock is in place. This mismatch of expectation and actual behavior can occur because users expect an object level lock, but Object Lock is a misnomer that only protects versions, not objects, from deletion. The present techniques can be implemented to extend Object Lock to support all versioning modes of a bucket, while following other aspects of prior object storage protocol implementations.

In some examples, present techniques can be implemented in two aspects: (1) changing bucket level application programming interfaces (APIs) to allow various Object Lock and versioning configurations; and (2) defining how locks work with object operations in a versioning off or suspended bucket with Object Lock enabled. For the first aspect, prior Object Lock approaches can be followed by continuing to enable versioning when enabling Object Lock, while adding a new flag "x-emc-retain-versioning-state" in the request that can cause the versioning mode to stay in its current state.

With regard to aspect (2), a null version can be as follows. A create in a versioning off or suspended bucket can create a null version-one that does not have a version identifier (because it was created when versioning was not enabled). It can be that an object can have at most one null version, so the creation of a new null version will clean up the existing null version, if one exists. Then, a delete object request in a versioning suspended bucket can create a Delete Marker null version. Put together, an Object Lock on a null version can comprise a version level lock that prevents object-level delete and overwrite operations because those operations would try removing the existing locked null version, which is not allowed. This approach can allow for minimal changes to prior Object Lock implementation and behavior while extending it in a way that behaves the way that a user would expect for an object level lock. In some examples, if versioning is enabled on a bucket, then the Object Locks on each version of that object, including the null version, can work in a standard manner as implemented with prior approaches.

In some examples, the present techniques can be implemented as follows. The following numbering of the techniques is for clarity in one example, and it can be appreciated that there can be other examples of implementing the present techniques that omit portions described herein, and/or implement portions described herein in a different order than is described herein.

1. Versioning can comprise a feature of an object storage system that defines three states: off, enabled, and suspended.

1A. A bucket's default state can be versioning off.

1B. It can be that a versioning off bucket only ever has one state of any object, and that state can be referred to as a null version.

1C. A delete in a versioning off bucket can remove the object, which can comprise removing the null version.

1D. An overwrite in a versioning off bucket can comprise replacing the object with a new state—that is, the original null version can be removed, and a new null version can be created.

1E. A bucket can have versioning enabled. It can be that, once enabled, the bucket's versioning can never be moved back to off, but it can be later suspended.

1F. An overwrite in a versioning enabled bucket can create a non-null version with a unique version identifier (versionId). In some examples, this can mean that an object in a versioning enabled bucket can have N unique non-null versions and at most one null version. These versions can be kept in an order that they were created.

1G. In some examples, to remove a specific version, a DELETE request comprises a versionId of the version to be deleted, with "null" used to indicate deleting the null version.

1H. A DELETE request without a versionId in a versioning enabled bucket can create a new non-null version with a flag indicating it is a Delete Marker. A Delete Marker (DM) can be a special type of version that results in hypertext transfer protocol (HTTP) 404 ("not found") responses for GET/HEAD requests on an object, but the object will show up in version listing on the bucket. Multiple Delete Markers can exist for an object, and each can be removed by a DELETE request with its versionId passed, or by a lifecycle expiration rule.

1I. A request on a versioning enabled bucket can cause versioning to be suspended. Once suspended, the overwrite operations can behave like with a versioning off bucket (in 1D), with null versions being replaced with new null versions.

1J. A delete in a versioning suspended bucket can remove the current null version, if it exists, and make the latest version a new null version with type Delete Marker.

2. An object storage bucket can have Object Lock enabled on it, with either a header during bucket creation, or using an extension application programming interface (API) with object storage protocols that support it, which allows Object Lock to be enabled on an existing bucket.

2A. When Object Lock is enabled, it can be that versioning will automatically be enabled, if it is not already enabled.

2B. It can be that versioning cannot be suspended on an Object Lock enabled bucket, nor can Object Lock be disabled.

3. It can be that each version in an Object Lock enabled bucket can have a lock applied to it. In some examples, a lock can have two components, with one or both being set: a retention lock can apply for a retention period, while a legal hold can comprise a flag that protects the object until the flag is unset. In some examples, the retention lock can itself have has two modes: Governance and Compliance, with Compliance having extra restrictions.

3A. A default Object Lock policy can be set on the bucket. For example, it can be that all versions created in the bucket default to having a 30-day Governance Retention lock.

3B. Each create operation can pass a header defining a lock for that version to be set during create. Where a default retention policy exists, then this passed lock can be used instead of the default lock.

3C. A version can be updated to have its lock changed. For example, a legal hold can be enabled or disabled. Or, a retention lock can be set or extended.

3D. A Governance retention lock can have its retention period reduced, or the lock removed, where a special bypass flag is passed, and the user has the needed permission.

3E. It can be that a compliance retention lock can only ever be increased, and it cannot be removed or decreased.

3F. A version can be referred to as "locked" where it has a legal hold or retention lock that has not passed its retention period.

4. It can be that a locked version only prevents version removal. A remove version operation (see, 1G) can be blocked if the version is locked. It can be that a lifecycle expiration cannot remove the version while it is locked.

4A. This can mean that a latest version being locked does not prevent overwrites (see, 1F) or deletes (see, 1H) because those operations create new versions and do not try to remove the locked version. This can confuse users who expect those operations to be blocked when a latest version is locked.

5. The present techniques can be implemented such that that Object Lock can be enabled on a bucket without versioning being enabled if a user passes a particular flag (e.g., "x-emc-retain-versioning-state: true") in the request. If the user does not pass such a flag, then a default behavior of enabling versioning can be maintained to stay in accordance with prior object storage protocols.

6. The present techniques can also be implemented such that suspending versioning is allowed on an Object Lock bucket, which can be different from prior object storage protocols.

7. A PUT in a versioning off or suspended bucket can be blocked if a locked null version exists. If no null version exists or it exists and is not locked, then the create can be successful.

7A. According to the present techniques, a PUT operation can support supports the bypass header of 3D. If the header is passed and the user has bypass permission (e.g., identity and authentication management permission), then the user can overwrite the object, which can remove the locked null version.

8. A DELETE request without versionId in a versioning off (see, 1C) or suspended (see, 1I) bucket can be blocked if a locked null version exists. If no null version exists, or the version is not locked, then the operation can be successful.

8A. A DELETE operation can support a bypass header (see, 3D) being passed, as in prior object storage protocols. It can be that such a bypass header is used when a versionId is passed because locks only protect deletes of versions in prior object storage protocols.

8B. According to the present techniques, it can be that the bypass header is used for DELETE operations without a versionId, and can cause a removal of a null version to be successful if bypass is allowed. In a versioning off bucket, this can mean that the object will be fully cleaned up (see, 1C). In a versioning suspended bucket, this can mean that a new null version DM is created, and the old null version is removed (see, 1I).

9. It can be that what is described in 5-8B extends Object Lock to all versioning modes. It can be that, according to the present techniques, behavior of Object Lock in versioning enabled buckets are unchanged from standard prior object storage protocols. This can mean that versioning can be enabled on an Object Lock bucket, and the object storage system can follow those prior object storage protocols.

It can be that prior object storage protocols restrict Object Lock behavior to only work in versioning enabled buckets. There can be other prior approaches that lock the object (or latest version) so that object level deletes and overwrites are blocked, but do not lock individual versions. In contrast, the present techniques can be implemented to use version level locks to prevent unwanted object level operations in versioning off/suspended buckets, while being similar to prior object storage protocols. In examples, where the present techniques are facilitated by locking just a null version, the present techniques can allow versioning to be enabled, and prior-technique Object Lock behavior to be used again.

Another approach according to the present techniques can be to allow locks, not at the version level, but the object level while in off/suspended modes. This approach could involve more changes relative to prior object storage protocols, and can be less consistent with the rest of Object Lock. The present techniques can be implemented via an implicit removal of a null version during object operations to use version level lock in a way that satisfies object level lock use cases.

The present techniques can allow users to use Object Locks in all versioning modes, which can give them the flexibility to use the bucket versioning mode they want while still using standard Object Lock requests to protect their data. The present techniques provide an ability to prevent object level overwrites and deletes in versioning off/suspended buckets, which can be what users expect and want from a locking system.

Example Architectures, Etc.

FIG. 1 illustrates an example system architecture 100 that can facilitate object lock across versioning modes in object storage, in accordance with an embodiment of this disclosure.

System architecture 100 comprises object storage system 102, communications network 104, and client computer 106. In turn, object storage system 102 comprises object lock across versioning modes in object storage component 108, and object storage 110.

System architecture 100 presents one logical example of implementing the present techniques, and it can be appreciated that there can be other example architectures.

Figure 13:
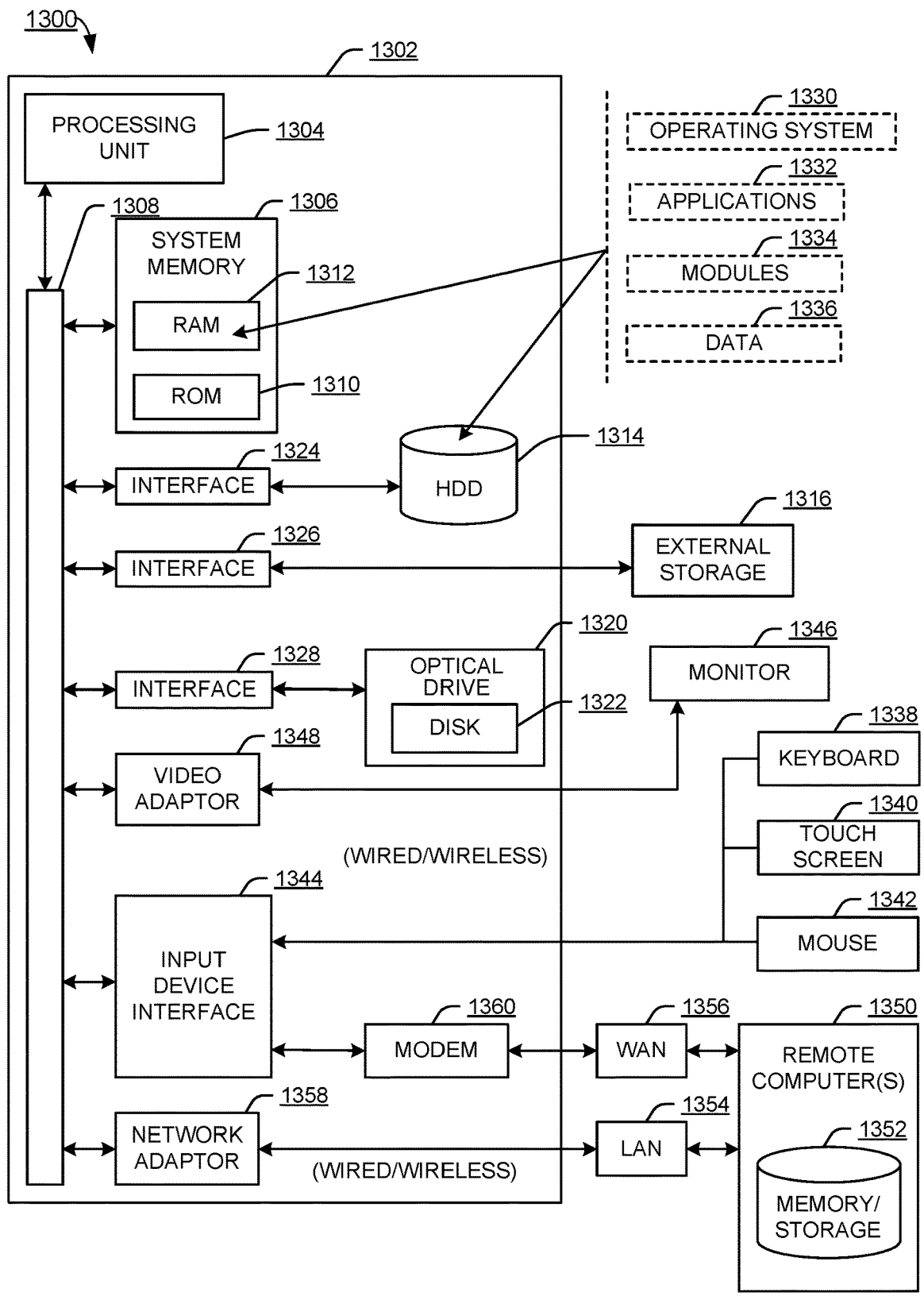
FIG. 13 illustrates an example block diagram of a computer operable to execute an embodiment of this disclosure.

Each of object storage system 102 and/or client computer 106 can be implemented with part(s) of computing environment 1300 of FIG. 13. Communications network 104 can comprise a computer communications network, such as the Internet, or an intranet.

Object storage system 102 can generally comprise a computer system that provides object storage resources (e.g., object storage 110) to multiple entities via communications network 104. Client computer 106 can generally comprise a computer accessible by a user account that sends object storage operations (e.g., PUT or DELETE) to object storage system 102.

In some examples, object lock across versioning modes in object storage component 108 can implement object locks across multiple types of versioning modes (e.g., off 202, enabled 204, and suspended 206 of FIG. 2) within object storage 110.

In some examples, object lock across versioning modes in object storage component 108 can implement part(s) of the process flows of FIGS. 5-12 to implement object lock across versioning modes in object storage.

It can be appreciated that system architecture 100 is one example system architecture for object lock across versioning modes in object storage, and that there can be other system architectures that facilitate object lock across versioning modes in object storage.

Figure 2:
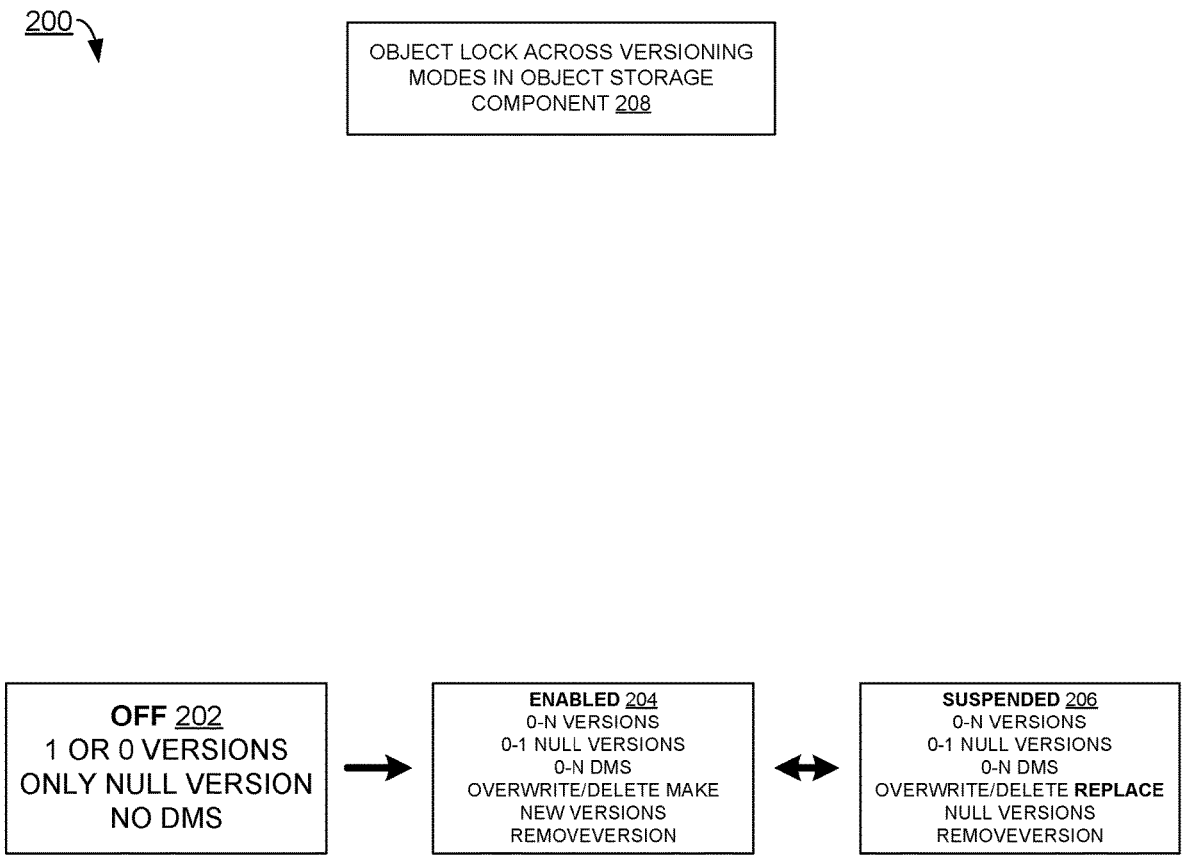
FIG. 2 illustrates an example of lock types can facilitate object lock across versioning modes in object storage, in accordance with an embodiment of this disclosure.

FIG. 2 illustrates an example 200 of lock types can facilitate object lock across versioning modes in object storage, in accordance with an embodiment of this disclosure. In some examples, part(s) of FIG. 2 can be used by part(s) of FIG. 1 to facilitate object lock across versioning modes in object storage. For example, part(s) of FIG. 2 can be used by object lock across versioning modes in object storage 110.

System architecture 200 comprises off 202, enabled 204, suspended 206, and object lock across versioning modes in object storage 208 (which can be similar to object lock across versioning modes in object storage component 108 of FIG. 1). Each of off 202, enabled 204, and suspended 206 can be types of versioning to implement in conjunction with an Object Lock.

In off 202, there can be 1 or 0 versions, only a null version, and no Delete Markers.

In enabled 204, there can be 0-N versions, 0-1 null versions, 0-N Delete Markers, overwrites and deletes make new versions, and RemoveVersion is enabled.

In suspended 206, there can be 0-N versions, 0-1 null versions, 0-N Delete Markers, overwrites and deletes replace null versions, and Remove Version is enabled.

FIG. 3 illustrates an example table 300 of versioning types that can facilitate object lock across versioning modes in object storage, in accordance with an embodiment of this disclosure. In some examples, part(s) of FIG. 3 can be used by part(s) of FIG. 1 to facilitate object lock across versioning modes in object storage. For example, part(s) of FIG. 3 can be used by object lock across versioning modes in object storage 110.

Table 300 comprises setup 302, overwrite 304, DeleteObject 306, Remove Version 308, null 310, non-null (locked) 312, versioning off 314, enabled 316, suspended 318, locked object 320, no object/no lock 322, locked null 324, no null/no lock 326, locked null 328, no null/no lock 330, and object lock across versioning modes in object storage 332 (which can be similar to object lock across versioning modes in object storage component 108 of FIG. 1).

Figure 4:
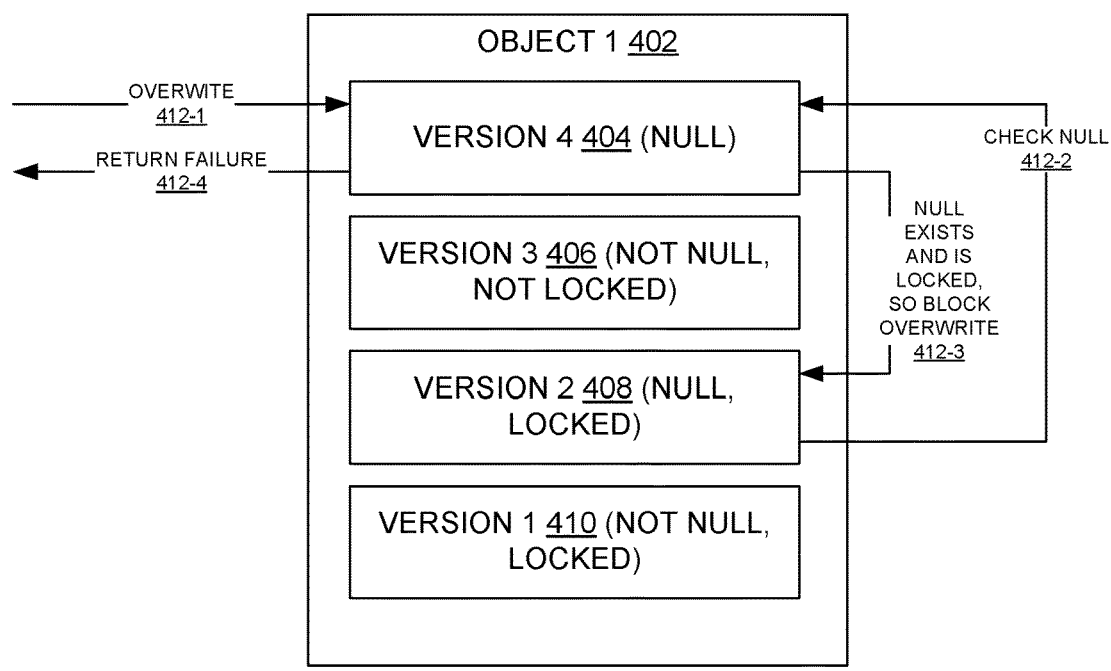
FIG. 4 illustrates another example system architecture that can facilitate object lock across versioning modes in object storage, in accordance with an embodiment of this disclosure.

FIG. 4 illustrates another example system architecture that can facilitate object lock across versioning modes in object storage, in accordance with an embodiment of this disclosure. In some examples, part(s) of FIG. 4 can be used by part(s) of FIG. 1 to facilitate object lock across versioning modes in object storage. For example, part(s) of FIG. 4 can be used by object lock across versioning modes in object storage 110.

System architecture 400 comprises object 1 402, and object lock across versioning modes in object storage component 414 (which can be similar to object lock across versioning modes in object storage component 108 of FIG. 1).

In turn, object 1 402 comprises multiple versions of the object-version 1 410 (not null, locked), version 2 408 (null, locked), version 3 406 (not null, not locked), and version 4 404 (null). These versions can be created in a temporal order, with version 1 410 being created first, and version 4 404 being created most recently.

Then, operations can be performed regarding object 1 402 as part of an attempt to overwrite the object. Overwrite 412-1 can be issued in an attempt to overwrite version 4 404. To process this operation, check null 412-2 can be performed on version 2 408, which is the oldest null version in object 1 402. Because null 412-2 is locked, the determination can be null exists and is locked, so block overwrite 412-3. As a result, instead of overwriting version 4 404, return failure 412-4 can be returned in response to overwrite 412-1.

Example Process Flows

Figure 5:
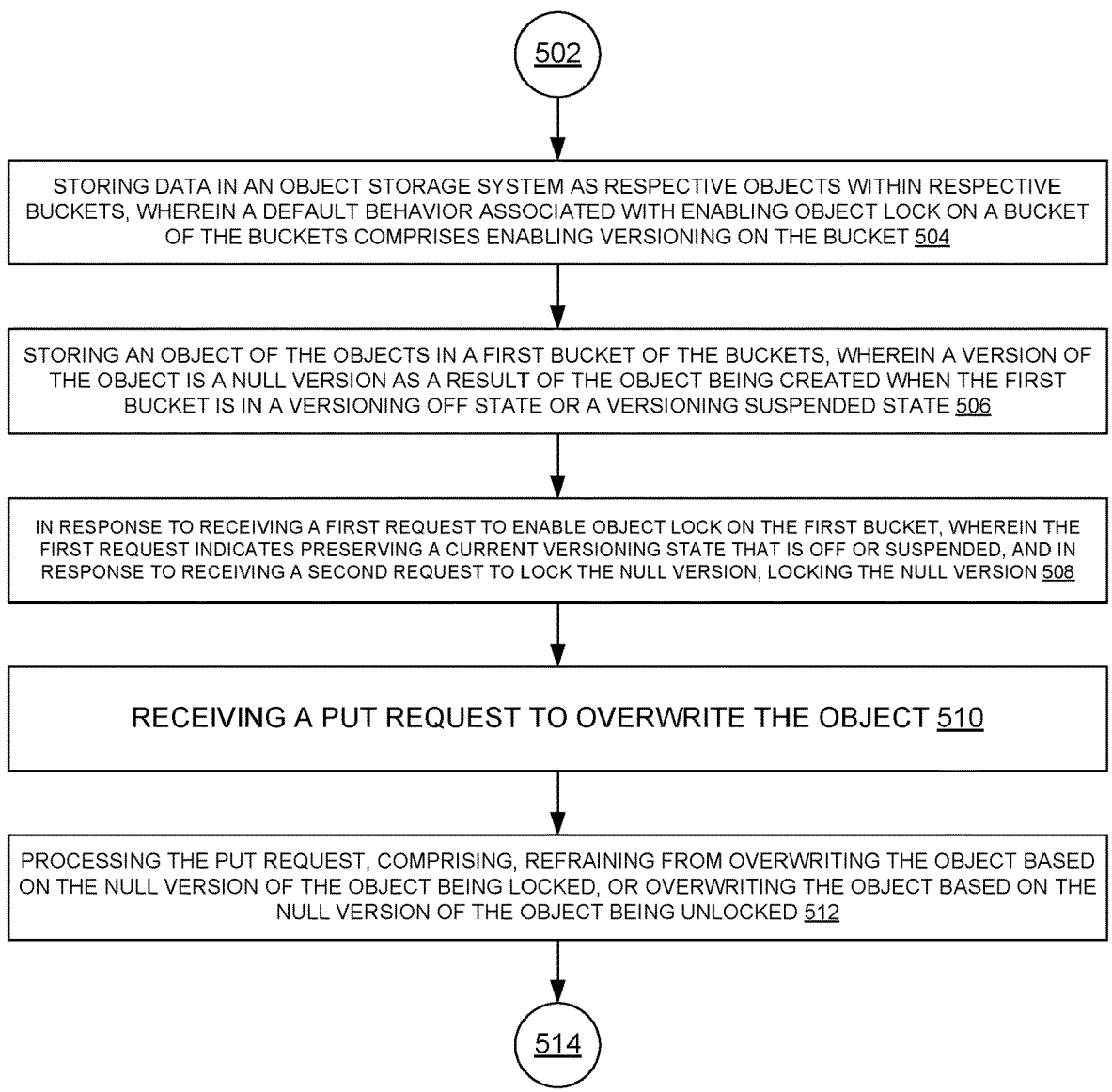
FIG. 5 illustrates an example process flow that can facilitate object lock across versioning modes in object storage, in accordance with an embodiment of this disclosure.

FIG. 5 illustrates an example process flow 500 that can facilitate object lock across versioning modes in object storage, in accordance with an embodiment of this disclosure. In some examples, one or more embodiments of process flow 500 can be implemented by object lock across versioning modes in object storage component 108 of FIG. 1, or computing environment 1300 of FIG. 13.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 500 begins with 502, and moves to operation 504.

Operation 504 depicts storing data in an object storage system as respective objects within respective buckets, wherein a default behavior associated with enabling object lock on a bucket of the buckets comprises enabling versioning on the bucket. That is, there can be object storage similar to object storage 110 of FIG. 1. The default for the object storage can be that enabling object lock for a bucket also turns on versioning.

After operation 504, process flow 500 moves to operation 506.

Operation 506 depicts storing an object of the objects in a first bucket of the buckets, wherein a version of the object is a null version as a result of the object being created when the first bucket is in a versioning off state or a versioning suspended state. That is, a null version of an object (similar to as described with respect to off 202 or suspended 206 of FIG. 2) can be created when versioning is off or suspended.

After operation 506, process flow 500 moves to operation 508.

Operation 508 depicts, in response to receiving a first request to enable object lock on the first bucket, wherein the first request indicates preserving a current versioning state that is off or suspended, and in response to receiving a second request to lock the null version, locking the null version. That is, a lock can be enabled, which can be similar to as described regarding enabled 204 of FIG. 4. When the lock is enabled, and there are multiple versions, it can be that the null version of an object is locked, and other versions (using the example of FIG. 4, e.g., version 3 406) are not locked.

After operation 508, process flow 500 moves to operation 510.

Operation 510 depicts receiving a PUT request to overwrite the object. In some examples, this PUT request can be similar to overwrite 412-1 of FIG. 4.

After operation 510, process flow 500 moves to operation 512.

Operation 512 depicts processing the PUT request, comprising, refraining from overwriting the object based on the null version of the object being locked, or overwriting the object based on the null version of the object being unlocked. Refraining from overwriting the first version can be performed in a similar manner as 412-2, 412-3, and 412-4 of FIG. 4. And overwriting the first version can be performed where the null version of the object that corresponds to the PUT request is not locked.

After operation 512, process flow 500 moves to 514, where process flow 500 ends.

FIG. 6 illustrates an example process flow 600 that can facilitate object lock across versioning modes in object storage, in accordance with an embodiment of this disclosure. In some examples, one or more embodiments of process flow 600 can be implemented by object lock across versioning modes in object storage component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 600 begins with 602, and moves to operation 604.

Operation 604 depicts enabling versioning on a bucket. That is, similar to [6] as described above, suspended versioning can be permitted on an object lock bucket.

Where process flow 600 is implemented in conjunction with process flow 500 of FIG. 5, the bucket of process flow 600 can be a second bucket relative to a first bucket of process flow 500.

After operation 604, process flow 600 moves to operation 606.

Operation 606 depicts, after enabling the versioning on the bucket, suspending versioning on the bucket, wherein writing to an existing object in the bucket comprises overwriting a null version of the existing object.

After operation 606, process flow 600 moves to 608, where process flow 600 ends.

Figure 7:
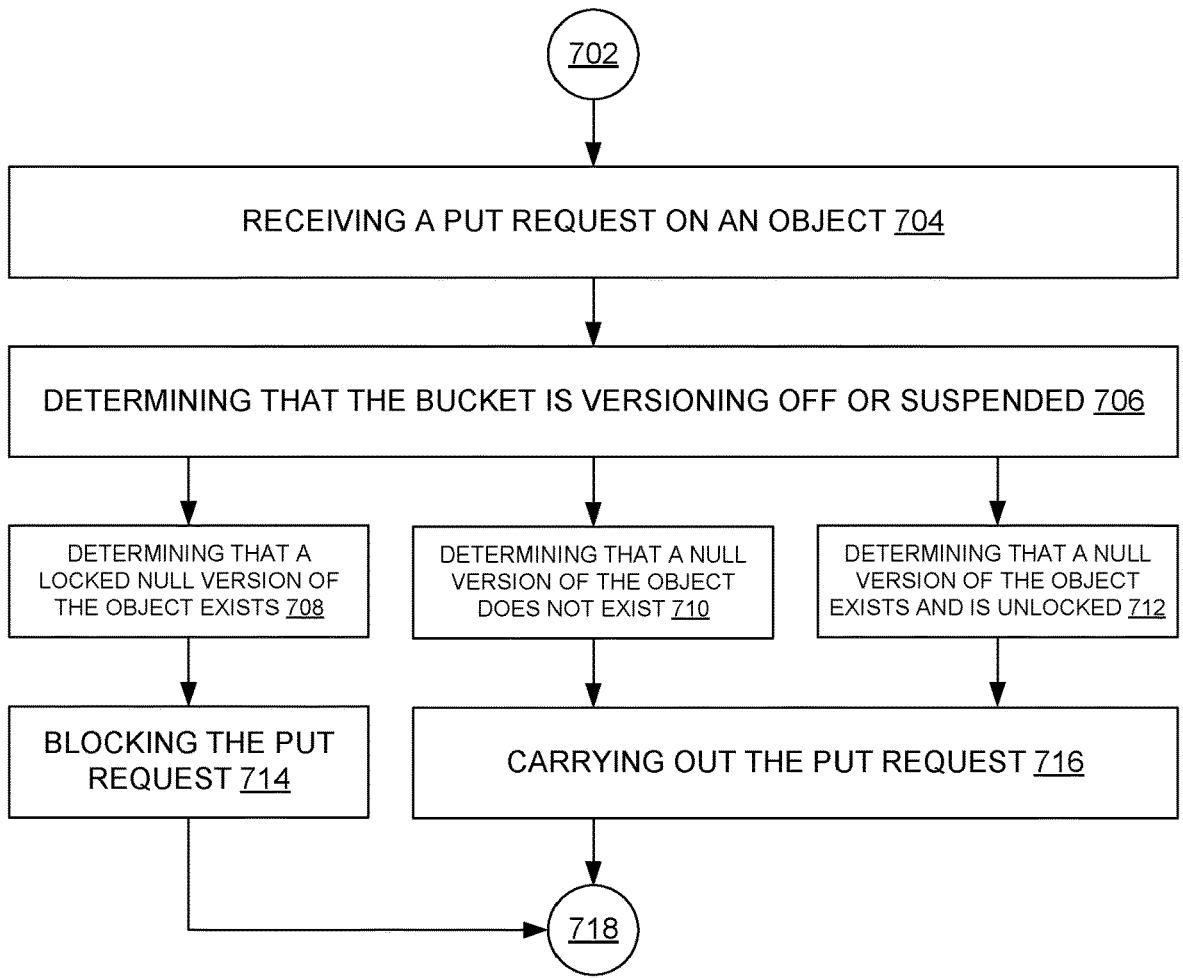
FIG. 7 illustrates an example process flow that can facilitate object lock across versioning modes in object storage, in accordance with an embodiment of this disclosure.

FIG. 7 illustrates an example process flow 700 that can facilitate object lock across versioning modes in object storage, in accordance with an embodiment of this disclosure. In some examples, one or more embodiments of process flow 700 can be implemented by object lock across versioning modes in object storage component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 begins with 702, and moves to operation 704.

Operation 704 depicts receiving a PUT request on an object. That is, similar to [7] above, it can be that a PUT in a versioning off or suspended bucket is be blocked where a locked null version exists. Then, where no null version exists or a null version exists that is not locked, then a create (that corresponds to the PUT request) can be successful.

Where process flow 700 is implemented in conjunction with process flow 500 of FIG. 5, the PUT request, bucket, and object of process flow 700 can be a second PUT request, second bucket, and second object relative to a first PUT request, first bucket, and first object of process flow 500.

After operation 704, process flow 700 moves to operation 706.

Operation 706 depicts determining that the bucket is versioning off or suspended.

After operation 706, process flow 700 moves to operation 708, operation 710, or operation 712 (depending on the determination made in those operations)

Operation 708 depicts determining that a locked null version of the object exists.

After operation 708, process flow 700 moves to operation 714.

Operation 710 depicts determining that a null version of the object does not exist.

After operation 710, process flow 700 moves to operation 716.

Operation 712 depicts determining that a null version of the object exists and is unlocked.

After operation 712, process flow 700 moves to operation 716.

Operation 714 depicts blocking the PUT request.

After operation 714, process flow 700 moves to 718, where process flow 700 ends.

Operation 716 depicts carrying out the PUT request.

After operation 716, process flow 700 moves to 718, where process flow 700 ends.

FIG. 8 illustrates an example process flow 800 that can facilitate object lock across versioning modes in object storage, in accordance with an embodiment of this disclosure. In some examples, one or more embodiments of process flow 800 can be implemented by object lock across versioning modes in object storage component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 begins with 802, and moves to operation 804.

Operation 804 depicts storing an object in a bucket of an object storage system, wherein the object is associated with a null version identifier as a result of the object being created when the first bucket is in a versioning off state or a versioning suspended state, and wherein a default behavior associated with enabling an object lock in the object storage system comprises enabling versioning in the object storage system. In some examples, operation 804 can be performed in a similar manner as operations 504-506 of FIG. 5.

After operation 804, process flow 800 moves to operation 806.

Operation 806 depicts, in response to receiving a first request to enable object lock on the first bucket, wherein the first request indicates preserving a current versioning state that is off or suspended, and in response to receiving a second request to lock the null version, locking, by the system, the null version. In some examples, operation 806 can be performed in a similar manner as operation 508 of FIG. 5.

After operation 806, process flow 800 moves to operation 808.

Operation 808 depicts receiving a PUT request to overwrite the object. In some examples, operation 808 can be performed in a similar manner as operation 510 of FIG. 5.

After operation 808, process flow 800 moves to operation 810.

Operation 810 depicts processing the PUT request, comprising, in a first case where the null version of the object remains locked, refraining from overwriting the object, or in a second case where the null version of the object has become unlocked, overwriting the object. In some examples, operation 810 can be performed in a similar manner as operation 512 of FIG. 5.

After operation 810, process flow 800 moves to 812, where process flow 800 ends.

Figure 9:
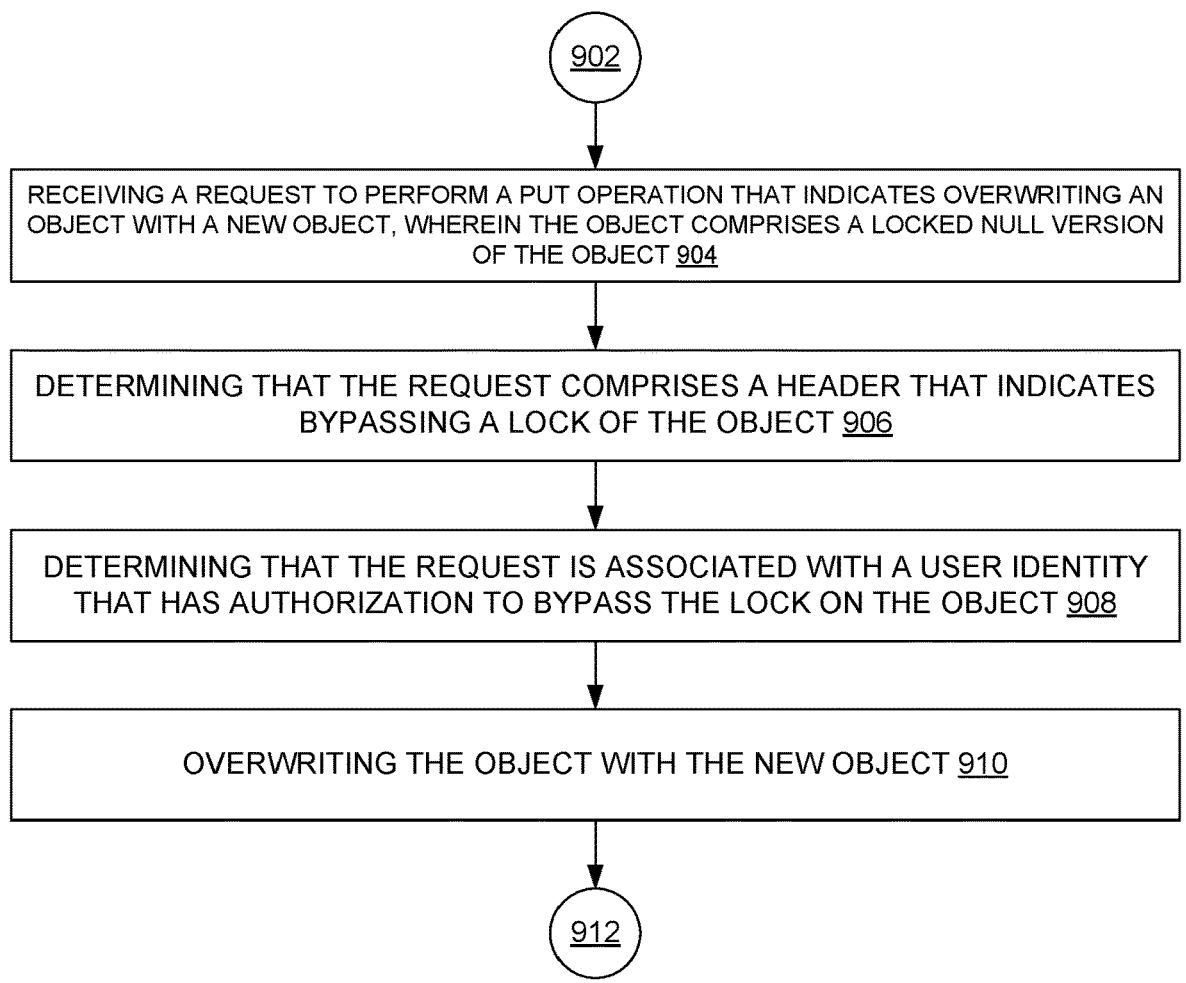
FIG. 9 illustrates an example process flow that can facilitate object lock across versioning modes in object storage, in accordance with an embodiment of this disclosure.

FIG. 9 illustrates an example process flow 900 that can facilitate object lock across versioning modes in object storage, in accordance with an embodiment of this disclosure. In some examples, one or more embodiments of process flow 900 can be implemented by object lock across versioning modes in object storage component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

Operation 904 depicts receiving a request to perform a PUT operation that indicates overwriting a locked null version of an object with a new object. Where process flow 900 is implemented in conjunction with process flow 800 of FIG. 8 (for example), request and the object of process flow 900 can be a third request and a second object, respectively, relative to first and second requests and a first object of process flow 800. After operation 904, process flow 900 moves to operation 906.

Operation 906 depicts determining that the request comprises a header that indicates bypassing a lock of the second object. This can comprise a bypass header as described above with respect to [3D] and [7A].

After operation 906, process flow 900 moves to operation 908.

Operation 908 depicts determining that the request is associated with a user identity that has authorization to bypass the lock on the object. In some examples, operation 908 comprises determining that the user identity is identified in an identity and authorization management system as having permission to overwrite the object. This can comprise determining whether the user has a bypass identity access management (IAM) permission; if so, then the user can be authorized to overwrite the object.

After operation 908, process flow 900 moves to operation 910.

Operation 910 depicts overwriting the object with the new object.

After operation 910, process flow 900 moves to 912, where process flow 900 ends.

Figure 10:
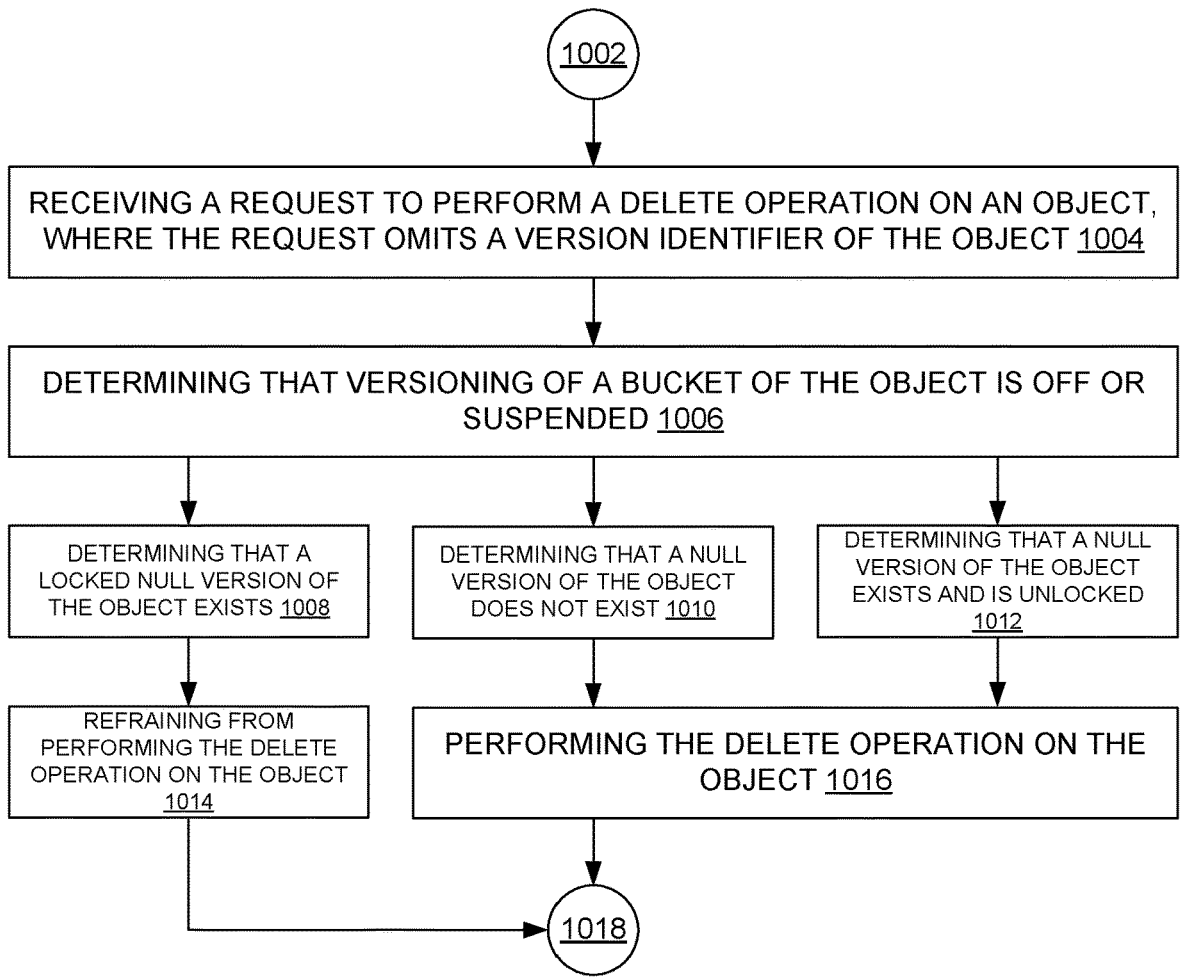
FIG. 10 illustrates an example process flow that can facilitate object lock across versioning modes in object storage, in accordance with an embodiment of this disclosure.

FIG. 10 illustrates an example process flow 1000 that can facilitate object lock across versioning modes in object storage, in accordance with an embodiment of this disclosure. In some examples, one or more embodiments of process flow 1000 can be implemented by object lock across versioning modes in object storage component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts receiving a request to perform a DELETE operation on an object, where the request omits a version identifier of the object. This can be similar to a DELETE request as described in [8] above. That is, a DELETE request without versionId in a versioning off (as in [1C]) or suspended (as in [1I]) bucket can be blocked if a locked null version exists. Where no null version exists or the version is not locked, then the operation can be successful.

Where process flow 1000 is implemented in conjunction with process flow 800 of FIG. 8 (for example), the object of process flow 1000 can be a second object, relative to a first object of process flow 800.

After operation 1004, process flow 1000 moves to operation 1006.

Operation 1006 depicts determining that versioning of a bucket of the object is off or suspended.

After operation 1006, process flow 1000 moves to operation 1008, operation 1010, or operation 1012 (depending on the determination in those operations)

Operation 1008 depicts determining that a locked null version of the object exists.

After operation 1008, process flow 1000 moves to operation 1014.

Operation 1010 depicts determining that a null version of the object does not exist.

After operation 1010, process flow 1000 moves to operation 1016.

Operation 1012 depicts determining that a null version of the object exists and is unlocked.

After operation 1012, process flow 1000 moves to operation 1016.

Operation 1014 depicts refraining from performing the DELETE operation on the object.

After operation 1014, process flow 1000 moves to 1018, where process flow 1000 ends.

Operation 1016 depicts performing the DELETE operation on the object

After operation 1016, process flow 1000 moves to 1018, where process flow 1000 ends.

Figure 11:
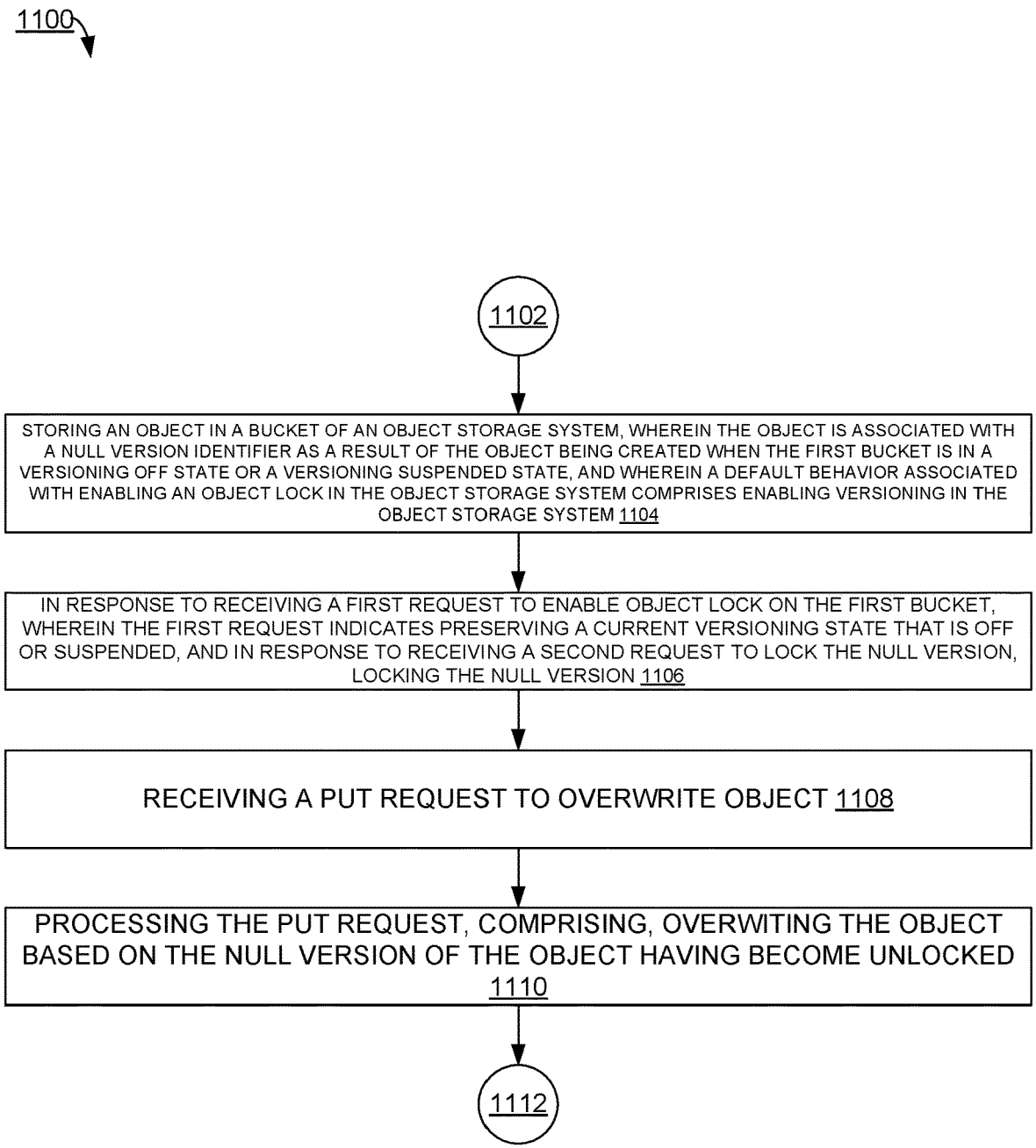
FIG. 11 illustrates another example process flow that can facilitate object lock across versioning modes in object storage, in accordance with an embodiment of this disclosure.

FIG. 11 illustrates an example process flow 1100 that can facilitate object lock across versioning modes in object storage, in accordance with an embodiment of this disclosure. In some examples, one or more embodiments of process flow 1100 can be implemented by object lock across versioning modes in object storage component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1100 begins with 1102, and moves to operation 1104.

Operation 1104 depicts storing an object in a bucket of an object storage system, wherein the object is associated with a null version identifier as a result of the object being created when the first bucket is in a versioning off state or a versioning suspended state, and wherein a default behavior associated with enabling an object lock in the object storage system comprises enabling versioning in the object storage system. In some examples, operation 1104 can be performed in a similar manner as operations 504-506 of FIG. 5.

In some examples, the object is associated with the null version identifier based on the object being created when versioning was off or suspended for the object, and wherein the null version identifier omits identifying a version of the object.

After operation 1104, process flow 1100 moves to operation 1106.

Operation 1106 depicts, in response to receiving a first request to enable object lock on the first bucket, wherein the first request indicates preserving a current versioning state that is off or suspended, and in response to receiving a second request to lock the null version, locking the null version. In some examples, operation 1106 can be performed in a similar manner as operation 508 of FIG. 5.

After operation 1106, process flow 1100 moves to operation 1108.

Operation 1108 depicts receiving a PUT request to overwrite the object. In some examples, operation 1108 can be performed in a similar manner as operation 510 of FIG. 5.

After operation 1108, process flow 1100 moves to operation 1110.

Operation 1110 depicts processing the PUT request, comprising overwriting the object based on the null version of the object having become unlocked. In some examples, operation 1110 can be performed in a similar manner as operation 512 of FIG. 5.

In some examples, operation 1110 comprises refraining from overwriting the object when the PUT request omits identifying bypassing object lock versioning. That is, it can be that a PUT request is not carried out where there is a locked null version and the PUT request omits a bypass header.

After operation 1110, process flow 1100 moves to 1112, where process flow 1100 ends.

Figure 12:
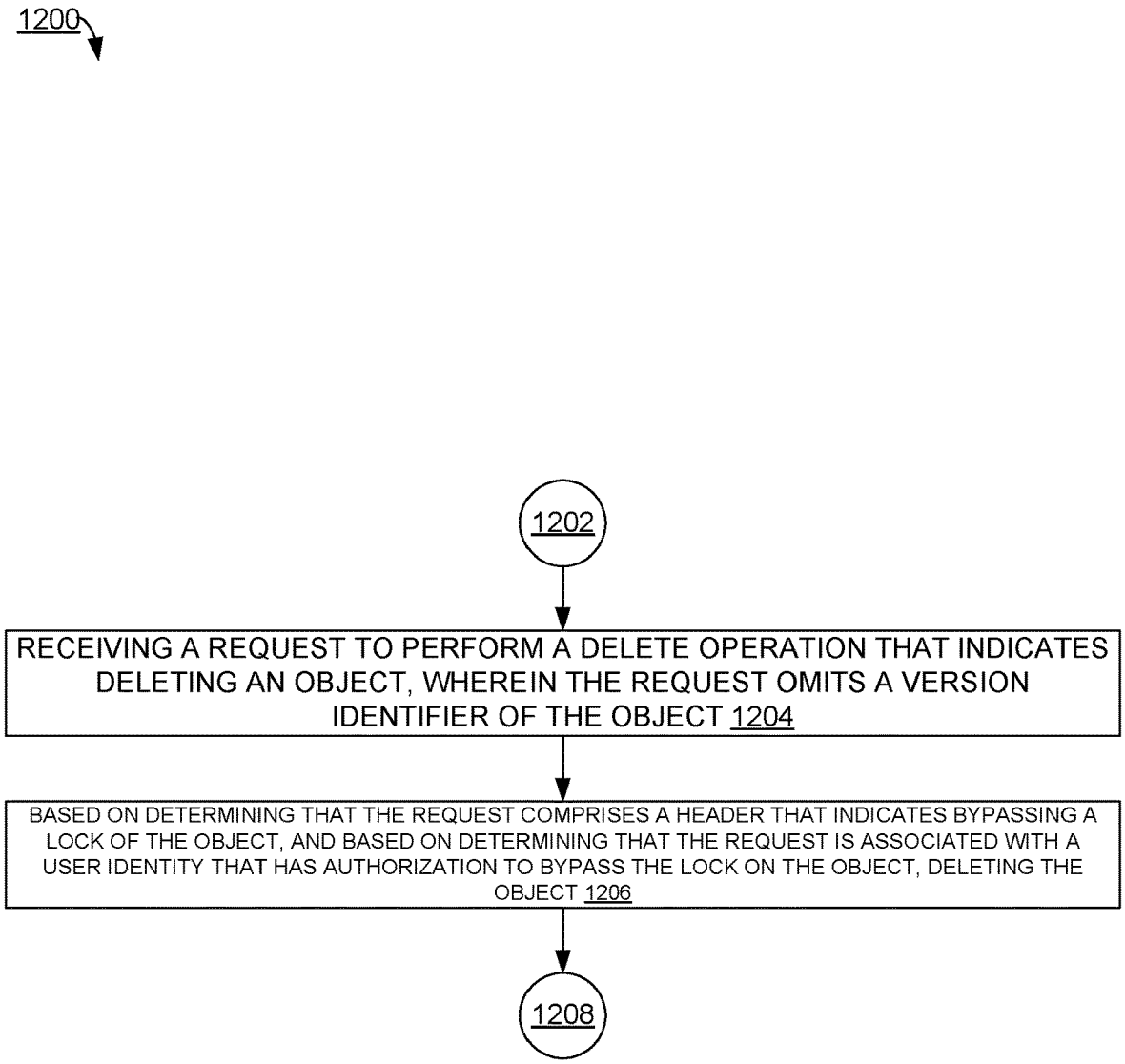
FIG. 12 illustrates another example process flow that can facilitate object lock across versioning modes in object storage, in accordance with an embodiment of this disclosure.

FIG. 12 illustrates an example process flow 1200 that can facilitate object lock across versioning modes in object storage, in accordance with an embodiment of this disclosure. In some examples, one or more embodiments of process flow 1200 can be implemented by object lock across versioning modes in object storage component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1200 of FIG. 12, and/or process flow 1200 of FIG. 12.

Process flow 1200 begins with 1202, and moves to operation 1204.

Operation 1204 depicts receiving a request to perform a DELETE operation that indicates deleting an object, wherein the request omits a version identifier of the object.

Where process flow 1200 is implemented in conjunction with process flow 1000 of FIG. 10 (for example), the request and the object of process flow 1200 can be a third request and a second object, respectively, and relative to first and second requests and a first object of process flow 800.

After operation 1204, process flow 1200 moves to operation 1206.

Operation 1206 depicts based on determining that the request comprises a header that indicates bypassing a lock of the object, and based on determining that the request is associated with a user identity that has authorization to bypass the lock on the object, deleting the object.

In some examples, where versioning is off on the object, deleting the object comprises removing the object, independently of creating a delete marker that corresponds to the object.

In some examples where versioning is suspended on the object, deleting the object comprises creating a new null version delete marker for the object, removing a pre-existing null version of the object.

After operation 1206, process flow 1200 moves to 1208, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of object storage system 102, and/or client computer 106.

In some examples, computing environment 1300 can implement one or more embodiments of the process flows of FIGS. 5-12 to facilitate object lock across versioning modes in object storage.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, stand-alone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      storing data in an object storage system as respective objects within respective buckets, wherein a default behavior associated with enabling object lock on a bucket of the buckets comprises enabling versioning on the bucket;
      storing a first object of the objects in a first bucket of the buckets, wherein a version of the first object is a null version as a result of the first object being created when the first bucket is in a versioning off state or a versioning suspended state;
      in response to receiving a first request to enable object lock on the first bucket, wherein the first request indicates preserving a current versioning state that is off or suspended, and in response to receiving a second request to lock the null version, locking the null version;
      receiving a first PUT request to overwrite the first object;
      processing the first PUT request, comprising,
         refraining from overwriting the first object based on the null version of the first object being locked, or overwriting the first object based on the null version of the first object being unlocked; and
      based on receiving a second PUT request that indicates overwriting a second object with a new second object, based on determining that the second PUT request comprises a header that indicates bypassing a lock of the second object, and based on determining that the second PUT request is associated with a user identity that has authorization to bypass the lock on the second object, overwriting the second object with the new second object.

2. The system of claim 1, wherein the operations further comprise:
   enabling versioning on a second bucket of the buckets; and
   after enabling the versioning on the second bucket, suspending versioning on the second bucket, wherein writing to an existing object in the second bucket comprises overwriting a null version of the existing object.

3. The system of claim 1, wherein the operations further comprise:
   receiving a third PUT request on a third object of the objects for a versioning-off bucket of the buckets; and
   in response to determining that a locked null version of the third object exists, blocking the third PUT request from being performed.

4. The system of claim 1, wherein the operations further comprise:
   receiving a third PUT request on a third object of the objects for a versioning-suspended bucket of the buckets; and
   in response to determining that a locked null version of the third object exists, blocking the third PUT request from being performed.

5. The system of claim 1, wherein the operations further comprise:
   receiving a third PUT request on a third object of the objects for a versioning-suspended bucket of the buckets; and
   in response to determining that a locked null version of the third object does not exist, performing the third PUT request.

6. The system of claim 1, wherein the operations further comprise:
   receiving a third PUT request on a third object of the objects for a versioning-off bucket of the buckets; and
   in response to determining that a locked null version of the third object does not exist, performing the third PUT request.

7. The system of claim 1, wherein the operations further comprise:
   receiving a third PUT request on a third object of the objects for a versioning-suspended bucket of the buckets; and
   in response to determining that a null version of the third object exists and is unlocked, performing the third PUT request.

8. The system of claim 1, wherein the operations further comprise:
   receiving a third PUT request on a third object of the objects for a versioning-off bucket of the buckets; and
   in response to determining that a null version of the third object exists and is unlocked, performing the third PUT request.

9. A method, comprising:
   storing, by a system comprising at least one processor, a first object in a bucket of an object storage system, wherein the first object is associated with a null version identifier as a result of the first object being created when the bucket is in a versioning off state or a versioning suspended state, and wherein a default behavior associated with enabling an object lock in the object storage system comprises enabling versioning in the object storage system;
   in response to receiving a first request to enable object lock on the bucket, wherein the first request indicates preserving a current versioning state that is off or suspended, and in response to receiving a second request to lock a null version of the first object, locking, by the system, the null version;
   receiving, by the system, a first PUT operation to overwrite the first object;

processing, by the system, the first PUT operation, comprising,
    in a first case where the null version of the first object remains locked, refraining, by the system, from overwriting the first object, or
    in a second case where the null version of the first object has become unlocked, overwriting, by the system, the first object; and
based on receiving a second PUT operation that indicates overwriting a second object with a new second object, based on determining that the second PUT operation comprises a header that indicates bypassing a lock of the second object, and based on determining that the second PUT operation is associated with a user identity that has authorization to bypass the lock on the second object, overwriting, by the system, the second object with the new second object.

10. The method of claim 9, wherein the determining that the third request is associated with the user identity that has the authorization to bypass the lock on the second object comprises:
    determining, by the system, that the user identity is identified in an identity and authorization management system as having permission to overwrite the second object.

11. The method of claim 9, further comprising:
based on receiving a third request to perform a DELETE operation on a third object, wherein the third request omits a version identifier of the third object,
based on determining that versioning of a bucket of the third object is off or suspended, and
based on determining that a locked null version of the third object exists,
refraining, by the system, from performing the DELETE operation on the third object.

12. The method of claim 9, further comprising:
based on receiving a third request to perform a DELETE operation on a third object, wherein the third request omits a version identifier of the second object,
based on determining that versioning of a bucket of the third object is off or suspended, and
based on determining that a locked null version of the third object does not exist,
performing, by the system, the DELETE operation on the third object.

13. The method of claim 9, further comprising:
based on receiving a third request to perform a DELETE operation on a third object, wherein the third request omits a version identifier of the third object,
based on determining that versioning of a bucket of the third object is off or suspended, and
based on determining that a null version of the third object exists and is unlocked,
performing, by the system, the DELETE operation on the third object.

14. A non-transitory computer-readable medium comprising instructions that, in response to execution, cause a system comprising a processor to perform operations, comprising:
    storing a first object in a bucket of an object storage system, wherein the first object is associated with a null version identifier as a result of the first object being created when the bucket is in a versioning off state or a versioning suspended state, and wherein a default behavior associated with enabling an object lock in the object storage system comprises enabling versioning in the object storage system;
    in response to receiving a first request to enable object lock on the bucket, wherein the first request indicates preserving a current versioning state that is off or suspended, and in response to receiving a second request to lock null version of the object, locking the null version;
    receiving a first PUT request to overwrite the first object;
    processing the first PUT request, comprising overwriting the first object based on the null version of the first object having become unlocked; and
    based on receiving a second PUT request that indicates overwriting a second object with a new second object, based on determining that the second PUT request comprises a header that indicates bypassing a lock of the second object, and based on determining that the second PUT request is associated with a user identity that has authorization to bypass the lock on the second object, overwriting the second object with the new second object.

15. The non-transitory computer-readable medium of claim 14, wherein processing the first PUT request comprises:
    refraining from overwriting the first object when the first PUT request omits identifying bypassing object lock versioning.

16. The non-transitory computer-readable medium of claim 14, wherein the operations further comprise:
    based on receiving a third request to perform a DELETE operation that indicates deleting a third object, wherein the third request omits a version identifier of the third object,
    based on determining that the third request comprises a header that indicates bypassing a lock of the third object, and
    based on determining that the third request is associated with a user identity that has authorization to bypass the lock on the third object,
    deleting the third object.

17. The non-transitory computer-readable medium of claim 16, wherein versioning is off on the third object, and wherein deleting the third object comprises:
    removing the third object, independently of creating a delete marker that corresponds to the third object.

18. The non-transitory computer-readable medium of claim 16, wherein versioning is suspended on the third object, and wherein deleting the third object comprises:
    creating a new null version delete marker for the third object; and
    removing a pre-existing null version of the third object.

19. The non-transitory computer-readable medium of claim 14, wherein the first object is associated with the null version identifier based on the first object being created when versioning was off or suspended for the first object, and wherein the null version identifier omits identifying a version of the first object.

20. The non-transitory computer-readable medium of claim 14, wherein the bucket is a first bucket, and wherein the operations further comprise:
    enabling versioning on a second bucket of the object storage system; and
    after enabling the versioning on the second bucket, suspending versioning on the second bucket, wherein writing to an existing object in the second bucket comprises overwriting a null version of the existing object.

* * * * *